(12) United States Patent
Cavelius et al.

(10) Patent No.: US 12,215,794 B2
(45) Date of Patent: Feb. 4, 2025

(54) LIQUID SUPPLY OF A BLOCK STORAGE ELEMENT

(71) Applicant: Jungheinrich Aktiengesellschaft, Hamburg (DE)

(72) Inventors: Jörg Cavelius, Bad Vilbel (DE); Volker Rollwa, Pirmasens (DE); Markus Liebhaber, Oberursel (DE)

(73) Assignee: JUNGHEINRICH AKTIENGESELLSCHAFT, Hamburg (DE)

( * ) Notice: Subject to any disclaimer, the term of this patent is extended or adjusted under 35 U.S.C. 154(b) by 256 days.

(21) Appl. No.: 17/703,399

(22) Filed: Mar. 24, 2022

(65) Prior Publication Data

US 2022/0307617 A1    Sep. 29, 2022

(30) Foreign Application Priority Data

Mar. 25, 2021    (EP) .................................... 21164918

(51) Int. Cl.
| | |
|---|---|
| *F16K 21/18* | (2006.01) |
| *A01G 9/14* | (2006.01) |
| *A01G 25/16* | (2006.01) |

(52) U.S. Cl.
CPC ................ *F16K 21/18* (2013.01); *A01G 9/14* (2013.01); *A01G 25/16* (2013.01)

(58) Field of Classification Search
CPC ................................ A01G 9/247; A01G 31/06
See application file for complete search history.

(56) References Cited

U.S. PATENT DOCUMENTS 10,842,095 B2 *   11/2020   Ivanescu .................. A01G 9/20

FOREIGN PATENT DOCUMENTS

| CN | 1335747 A | * | 2/2002 | ............ A01G 25/00 |
|---|---|---|---|---|
| DE | 102016112399 B3 | * | 7/2017 | ............ A01G 9/022 |
| EP | 3906776 A1 | * | 11/2021 | ............ A01G 18/62 |
| FR | 2761575 A1 | * | 10/1998 | ............ A01G 31/06 |
| GB | 2541687 A | * | 3/2017 | ............ A01G 31/06 |
| KR | 20120007420 A | * | 1/2012 | ............ A01G 31/06 |

* cited by examiner

*Primary Examiner* — Timothy L Maust
(74) *Attorney, Agent, or Firm* — GREENBLUM & BERNSTEIN, P.L.C.

(57) ABSTRACT

Block storage element and method for supplying liquid to a block storage element. The block storage element has an overflow and the method includes introducing the liquid into an overflow distributor with a distributor limit. The liquid is throttled by at least one passageway arranged in the distributor limit and gets into a tub area of the block storage element, and the liquid that is not drained by way of the at least one passageway is discharged via the overflow.

5 Claims, 2 Drawing Sheets

LIQUID SUPPLY OF A BLOCK STORAGE ELEMENT

CROSS-REFERENCE TO RELATED APPLICATION

The present application claims priority under 35 U.S.C. § 119(a) of Europe Patent Application No. 211 64 918.1 filed Mar. 25, 2021, the disclosure of which is expressly incorporated by reference herein in its entirety.

BACKGROUND

1. Field of the Invention

Embodiments of the present invention relates to a method for supplying liquid to a block storage element, the block storage element having an overflow. Embodiments further relate to a block storage element with a tub area and an overflow.

2. Discussion of Background Information

Block storage elements in greenhouse systems are supplied with liquid or a nutrient solution from outside, so that plants can grow in these block storage elements. To this end, for example, the liquid level in each block storage element is monitored, and adjusted to a desired value by controlling the inflow and/or outflow. This requires a plurality of components, such as valves, and also a sophisticated controller.

SUMMARY

Block storage elements according to embodiments are used in block storages or block storage systems in greenhouse systems to give the liquid supply and nutrient supply a simple design.

Embodiments are directed to a method in which liquid is introduced into an overflow distributor with a distributor limit, the liquid is throttled by at least one passageway arranged in the distributor limit and gets into a tub area of a block storage element, and liquid that is not drained by way of the at least one passageway is discharged via the overflow.

Moreover, embodiments are directed to a block storage element in which an overflow is arranged in an overflow distributor having a distributor limit with at least one passageway to the tub area, and a first cross section of the at least one passageway is essentially smaller than a second cross section of the overflow.

A block storage or a block storage system describes a storage system with at least one block storage element receiving room. Stackable block storage elements can be stored in and retrieved from the block storage element receiving room. For this purpose, at least one block storage element is stored in or retrieved from the block storage element receiving room through a loading room. The loading room can be arranged above or below the block storage element receiving room in the direction of gravity, so that a storage or retrieval direction is oriented in the direction of gravity or against the direction of gravity. The stowage and retrieval direction is established by the arrangement of the loading room. If the loading room is arranged above the block storage element receiving room, the stowage direction is in the direction of gravity, and the retrieval direction against the direction of gravity. If the loading room is arranged below the block storage element receiving room in the direction of gravity, the stowage direction is oriented against the direction of gravity, and the retrieval direction in the direction of gravity. If several block storage elements are stored in the block storage element receiving room, a block storage element stack comes about. In the following explanation, the block storage element receiving room is arranged below the loading room in the direction of gravity.

In the method of the kind mentioned at the outset, liquid is introduced via an overflow distributor with a distributor limit, wherein the liquid is throttled. by at least one passageway arranged in the distributor limit and gets into a tub area of the block storage element, and the liquid that is not chained by way of the at least one passageway is discharged via the overflow.

The liquid is introduced into the overflow distributor, which is separated from the tub area of the block storage element by a distributor limit. The overflow is further arranged inside of the overflow distributor. The liquid introduced into the overflow distributor gets through the at least one passageway, hereinafter referred to as passageway, and into the tub area, wherein the passageway throttles the quantity of liquid to he introduced. This causes the liquid level to rise within the overflow distributor, and once an upper end of the overflow has been reached, to be drained via the overflow. As a result of this arrangement, liquid is supplied to the block storage element without any need for valves or electronic controllers. This in turn simplifies the assembly, control, installation, and ease of maintenance for the block storage element.

For example, a cross sectional surface of the passageway can he adjusted to a cross sectional surface of the overflow. The cross sectional surface of the passageway here relates to the overall cross sectional surface of all passageways. To this end., the passageway can be formed by several passageways. Splitting the passageway into several passageways makes it possible to adjust the quantity of liquid to be let through to a desired throttling. in addition, the throttling, and hence the liquid supply of the tub area., can be finely adjusted in this way.

Liquid that is not conducted through the passageway into the tub area remains in the overflow distributor until the liquid level exceeds the upper end of the overflow. As soon as the liquid level rises above the upper end of the overflow, liquid is discharged by way of the overflow. This gives rise to a system that enables a precise and targeted liquid supply of the tub area of the block storage element. In addition, unneeded liquid is discharged from the block storage element early on, thereby preventing this liquid from becoming blended through contact with the interior of the tub area, which further prevents any preparation of the quantity of liquid discharged early on. This reduces the quantity of liquid to be prepared.

The liquid of a first block storage element discharged by way of the overflow is preferably conducted in a liquid guide of a second block storage element arranged below the first block storage element. As a result of this arrangement, a block storage stack comprised of at least two block storage elements can be supplied by introducing liquid into the first block storage element. To this end, liquid is introduced into the overflow distributor of the first block storage element, wherein a portion of the liquid gets through the passageway into the tub area of the first block storage element. The remaining portion of the introduced liquid is introduced into the liquid guide of the second block storage clement by way of the overflow of the overflow distributor of the first block storage element. The liquid guide of the second block storage element conducts the liquid into an overflow distributor of the second block storage element, from where a portion of the introduced liquid is introduced into the tub area of the second block storage element through the passageway of the overflow distributor. As a consequence, the second block storage element or its tub area is supplied with liquid. This arrangement eliminates the need for valves and their controllers, thus making the arrangement cost-effective.

For example, the liquid guide is designed as a funnel, so that an imprecise positioning of the first block storage element relative to the second block storage element has no influence on the transfer of liquid from the overflow of the first block storage element into the liquid guide of the second block storage element. This arrangement can also compensate for manufacturing tolerances and assembly inaccuracies.

The overflow is preferably a first overflow, and the liquid introduced into the block storage element from the overflow distributor is drained by way of a second inlet of a second overflow of an overflow collector. The first overflow drains fresh liquid that was not yet in contact with the tub area of the block storage element, wherein the second overflow discharges liquid from the tub area. This arrangement leaves a defined liquid level inside of the tub area, even if more liquid is introduced. As a result, the stored goods, for example comprised of plants, seedlings, seeds, mushrooms, or some other biological material, is always supplied with enough liquid. In addition, the liquid flows to the second overflow proceeding from the overflow distributor, for example. As a result, all areas of the tub area are supplied with liquid, so that the liquid is uniformly applied.

The liquid of a first block. storage element discharged by way of the second overflow is preferably conducted into a second liquid guide of a second block storage element arranged below the first block storage element. Transferring the discharged liquids of the first block storage element into the second liquid guide of the second block storage element prevents an undesired blending of fresh liquid and discharged liquid. As a result, the tub area is always supplied with fresh liquid, The liquid introduced by way of the second overflow of the; first block storage element into the second liquid guide of the second block storage element arranged under the first block storage element is preferably transferred by way of a first inlet of the second overflow into a third block storage element arranged below the second block storage element in the direction of gravity. As a result of this arrangement, consumed liquid is discharged from the first block storage element without the consumed liquid getting into a tub area of the second or third block storage element. The inflow of fresh liquid and outflow of consumed liquid are thus arranged separately from each other.

In addition, the aforementioned object is achieved by an overflow arranged in an overflow distributor, wherein the overflow distributor has a distributor limit with at least one passageway to the tub area, and wherein a first cross section of the at least one passageway is essentially smaller than a second cross section of the overflow. For example, the passageway can here also have several passageways that are separate from each other. The sum total of individual cross sections of the passageways comprises the first cross section.

The overflow is separated from the tub area by the distributor limit. Liquid is introduced into an area around the overflow, wherein the introduced quantity of liquid is greater than the quantity of liquid that gets through the passageway into the tub area, for example. Liquid that is not discharged through the passageway here leads to a rise in the liquid level within the overflow distributor. As soon as the liquid level has risen above an upper end of the overflow in the direction of gravity, liquid is discharged via the overflow. This makes it possible to control and/or regulate the liquid level without movable elements, so that a maintenance outlay can be reduced..

The at least one passageway is preferably arranged at least partially at the height of an upper end of the overflow in the direction of gravity and/or at least partially below the upper end of the overflow in the direction of gravity. This arrangement ensures that at least one portion of the liquid gets out of the overflow distributor and into the tub interior through the at least one passageway. In addition, the throttling of liquid can be adjusted independently of the liquid level by adjusting a passageway geometry, for example.

The overflow distributor is preferably arranged in a corner area of the tub area of the block storage element. Arranging the overflow distributor in a corner area keeps an interior of the tub area of the block storage element accessible from all sides. This makes it easy to handle, remove and stock stored goods from and in the tub area of the block storage element.

The overflow distributor preferably has a liquid guide, the lower end of which is arranged below the upper end of the overflow in the direction of gravity. Because the lower end of the liquid guide is arranged below the upper end of the overflow in the direction of gravity, liquid is introduced into the overflow distributor below the upper end of the overflow. This prevents liquid from getting directly into the overflow from the liquid guide. The liquid level must first rise within the overflow distributor before liquid is discharged by way of the overflow. This makes it possible to supply and relay liquid in a targeted manner.

The overflow is preferably a first overflow, and the block storage element has a second overflow with a first inlet and a second inlet, wherein the first inlet interacts with the interior of an overflow collector, and the second inlet with an exterior of the overflow collector. The exterior of the overflow collector is the tub area, for example. The second inlet can here be arranged at least partially in the tub area. The first inlet is spatially separated from the tub area. As a result, liquid can be drained from the tub area through the second inlet, wherein the first inlet serves only to discharge liquid that is introduced into the interior of the overflow collector. This arrangement prevents consumed liquid being conducted from the overflow distributor through the tub area to the overflow collector from again being mixed with fresh liquid. Instead, consumed liquid is discharged in a targeted mariner.

The liquid guide is preferably a first liquid guide, and a second liquid guide interacts with the interior of the overflow collector. The second liquid guide introduces consumed liquid discharged by way of the second overflow into the overflow collector. For example, this prevents a splashing or splattering of the consumed liquid, so that a blending of the consumed liquid with the liquid located in the tub area is avoided. In addition, the second liquid guide prevents a contamination by consumed liquid in the environment of the block storage element.

The second inlet is preferably arranged above the first inlet in the direction of gravity. As a result of this arrangement, liquid introduced through the second liquid guide is introduced into the first inlet, without there being a danger that liquid introduced via the second liquid guide will get into the tub area. Instead, the liquid introduced via the second liquid guide is discharged directly by way of the second overflow. This makes it possible to easily discharge the consumed liquid.

An upper end of the first inlet in the direction of gravity preferably lies at the same height as the floor of the overflow collector. This further avoids the danger of the liquid introduced via the second liquid guide spilling over into the tub area. In addition, only a small quantity of introduced liquid remains behind in the overflow collector in this arrangement. This small quantity does not offer any sufficient basis for the propagation of unwanted insects, mushrooms or other biological material that could lead to a disruption to the operating process. This improves the ease of use and cleaning for the block storage element.

The corner area is preferably a first corner area, wherein the overflow collector with the second overflow is arranged. in a second corner area, which differs from the first corner area. As a result, the liquid introduced by way of the overflow distributor must first run through the tub area before the liquid can be discharged via the overflow collector. As a result, the tub area is uniformly flooded, so that all elements arranged in the tub area are supplied and rinsed with liquid.

A first block storage element is preferably arranged above a second block storage element in the direction of gravity, wherein the first overflow of the block storage element is arranged above the first liquid guide of the second block storage element and/or the second overflow of the first block storage clement is arranged above the second liquid guide of the second block storage element. In this arrangement, for example, the first overflow of the first block storage element interacts with the first liquid guide of the second block storage element. In addition, for example, the second overflow of the first block storage element interacts with the second liquid guide of the second block storage element.

The first overflow and the first liquid guide here always come into contact with fresh liquid, so that the tub area is supplied. with fresh liquid proceeding from the overflow distributor.

The second overflow and the second liquid guide handle the consumed liquid, which is introduced into the second overflow proceeding from the tub area. The two arrangements separate the fresh liquid from the consumed liquid. As a result, it can be ensured that the tub area is supplied with fresh liquid that is not blended with consumed liquid.

For example, block storage elements arc stowed in a block storage. At least two block storage elements here comprise a block storage element stack. For example, fresh liquid is introduced by way of the first liquid guide of the first, uppermost block storage element. The liquid is introduced into the overflow distributor of the first block storage element via the first liquid guide. From there, a portion of the liquid gets into the tub area. The remaining portion of the introduced liquid remains in the overflow distributor, so that the liquid level inside of the overflow distributor of the first block storage element rises, until the liquid is discharged by way of the first overflow. From there, the liquid gets through the first liquid guide of a second block storage element into the overflow distributor of the second block storage element. The second block storage element is here arranged under the first block storage element. The process repeats itself there, so that the tub area is flooded at the second block storage element, and excess liquid is discharged via the first overflow.

In the block storage element stack described in the above paragraph, the liquid expands in the first block storage element in the tub area. The liquid level there rises until the liquid is discharged via the second inlet of the second overflow. From there, the discharged liquid gets into the second liquid guide of the second block storage element. The second liquid guide transfers the discharged liquid into the interior of the overflow collector, wherein the discharged liquid is further discharged directly by way of the first inlet of the second overflow, proceeding from the interior of the overflow collector.

The cascading supply of liquid to the individual block storage elements can be applied to a block storage element stack of any size. The arrangement of the overflow collector and overflow distributor in combination with the respective liquid guide here makes do without any movable parts. This leads to a good ease of maintenance.

Embodiments are directed to a method for supplying liquid to a block storage element having an overflow. The method includes introducing the liquid into an overflow distributor with a distributor limit. The liquid is throttled by at least one passageway arranged in the distributor limit and gets into a tub area of the block storage element, and the liquid that is not drained by way of the at least one passageway is discharged via the overflow.

In embodiments, the overflow can be a first overflow and the liquid introduced into the block storage element from the overflow distributor can be drained by way of a second inlet of a second overflow of an overflow collector.

According to embodiments, a first block storage element and a second block storage element are arranged one above the other and the liquid discharged via the overflow of the first block storage element is conducted in a liquid guide of a second block storage element arranged below the first block storage element. Further, the overflows of the first and second block storage elements are first overflows and the liquid introduced into the first and second block storage elements from respective overflow distributors can be drained by way of a second inlet of a second overflow of an overflow collector in each of the first and second block storage elements. The liquid drained via the second overflow of the first block storage element may be conducted into a second liquid guide of the second block storage element. Moreover, the liquid conducted into the second liquid guide of the second block storage element via the second overflow of the first block storage element is transferred by way of a first inlet of the second overflow of the second block storage element into a third block storage element arranged below the second block storage element in the direction of gravity.

Embodiments are directed to a block storage element that includes a tub area; an overflow; and an overflow distributor having a distributor limit with at least one passageway to the tub area. A first cross section of the at least one passageway is smaller than a second cross section of the overflow.

In embodiments, the at least one passageway can be arranged at least one of at least partially at a height of an upper end of the overflow in the direction of gravity or at least partially below the upper end of the Overflow in the direction of gravity.

According to other embodiments, the overflow distributor may be arranged in a corner area of the tub area.

According to still other embodiments, the overflow distributor can have a liquid guide, a lower end of which is arranged below an upper end of the overflow in the direction of gravity.

In other embodiments, the overflow is a first overflow, and the block storage element can further include an overflow collector and a second overflow with a first inlet and a second inlet. The first inlet interacts with an interior of the overflow collector, and the second inlet interacts with an exterior of the overflow collector. Further, the liquid guide is a first liquid guide, and the block storage element may further include a second liquid guide that interacts with the interior of the overflow collector. The second inlet can be arranged above the first inlet in the direction of gravity. Still further, an upper end of the first inlet in a direction of gravity is arranged at a same height as a floor of the overflow collector. The tub area can include a first corner area and a second corner area that differs from the first corner area, and the overflow distributor may be arranged in the first corner area and the overflow collector with the second overflow may be arranged in the second corner area.

In embodiments, a block storage element system can include at least a first and a second block storage element, as described above. The first block storage element can be arranged above the second block storage element in a direction of gravity. At least one of the overflow of the first block storage element may be arranged above the first liquid guide of the second block storage element or the second overflow of the first block storage element may be arranged above the second liquid guide of the second block storage element.

According to still yet other embodiments, a block storage element system can include at least a first and a second block storage element, as described above. The first block storage element may be arranged above the second block storage element in a direction of gravity, and the overflow of the first block storage element can be arranged above the first liquid guide of the second block storage element.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
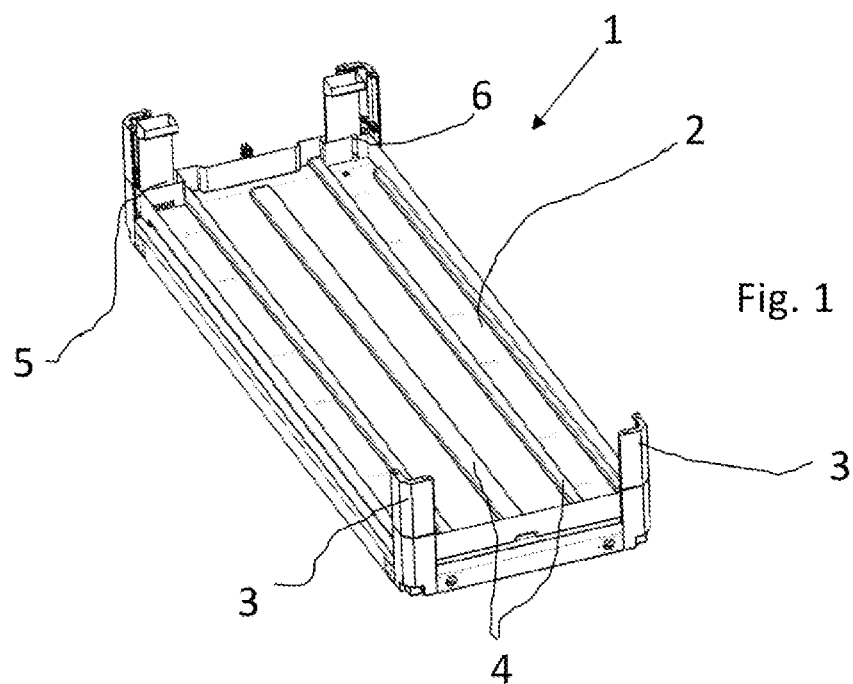
FIG. 1 illustrates a block storage element.

The block storage element 1 shown on FIG. 1 has a tub area 2 and stack geometries 3. Distributor elements 4 are provided in the tub area 2. An overflow distributor 5 is provided in a first corner area of the block storage element 1. An overflow collector 6 is provided in a second corner area of the block storage element 1.

Figure 2:
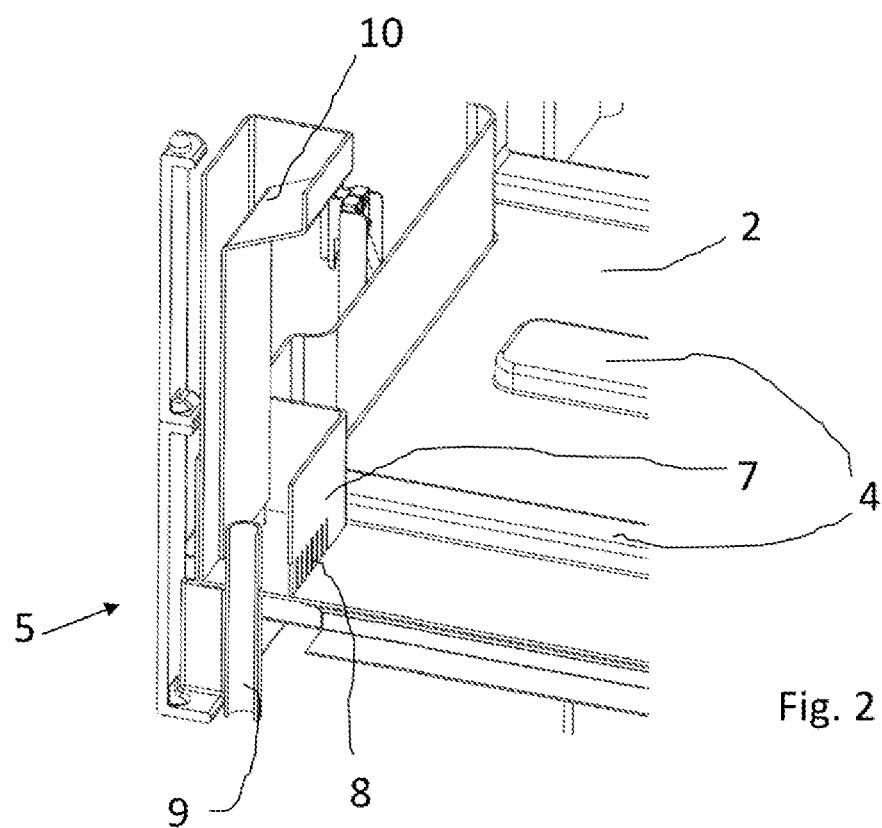
FIG. 2 illustrates a cut detailed view of the overflow distributor.

The overflow distributor 5 is shown cut or sectioned in FIG. 2. The overflow distributor 5 has a distributor limit 7 with several passageways 8. The distributor limit 7 delimits an area around a first overflow 9 from the tub area 2. A first liquid guide 10 empties into the area around the first overflow 9. A lower end of the liquid guide 10 in the direction of gravity is here arranged under an upper end of the first overflow 9. The first liquid guide 10 further has a funnellike shape, wherein a funnel inlet is arranged above the first overflow 9 in the direction of gravity. The passageways 8 connect the area around the first overflow 9, also referred to as the interior of the overflow distributor 5, with the tub area 2. Proceeding from the interior of the overflow distributor 5, liquid gets into the tub area 2 via the passageways 8. In the tub area 2, the liquid is conducted by way of distributor elements 4.

Figure 3:
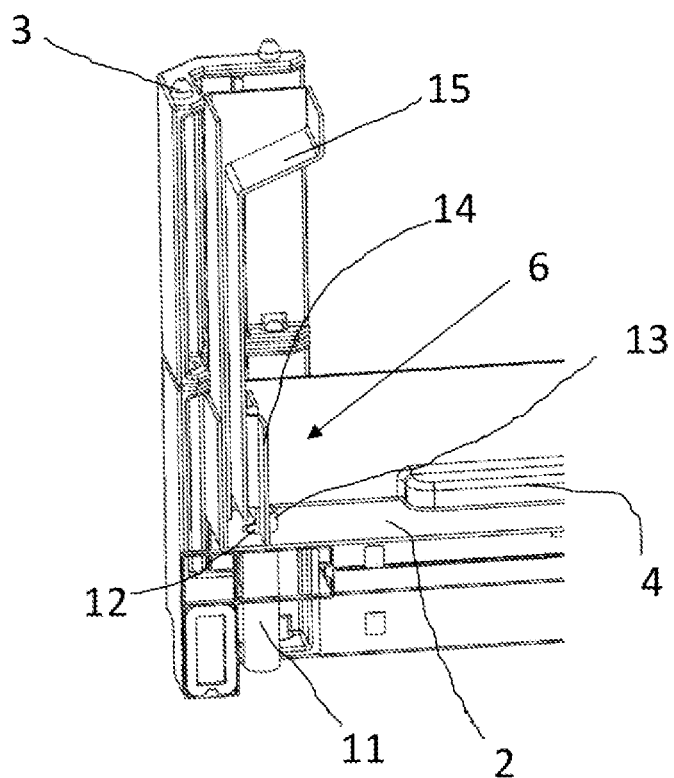
FIG. 3 illustrates a cut detailed view of the overflow collector.

FIG. 3 shows a cut or sectioned view of the overflow collector 6. The overflow collector 6 has a second overflow 11 with a first inlet 12 and a second inlet 13, wherein the two inlets 12, 13 are separated from each other by a boundary 14. Further a second liquid guide 15 is provided.

Figure 4:
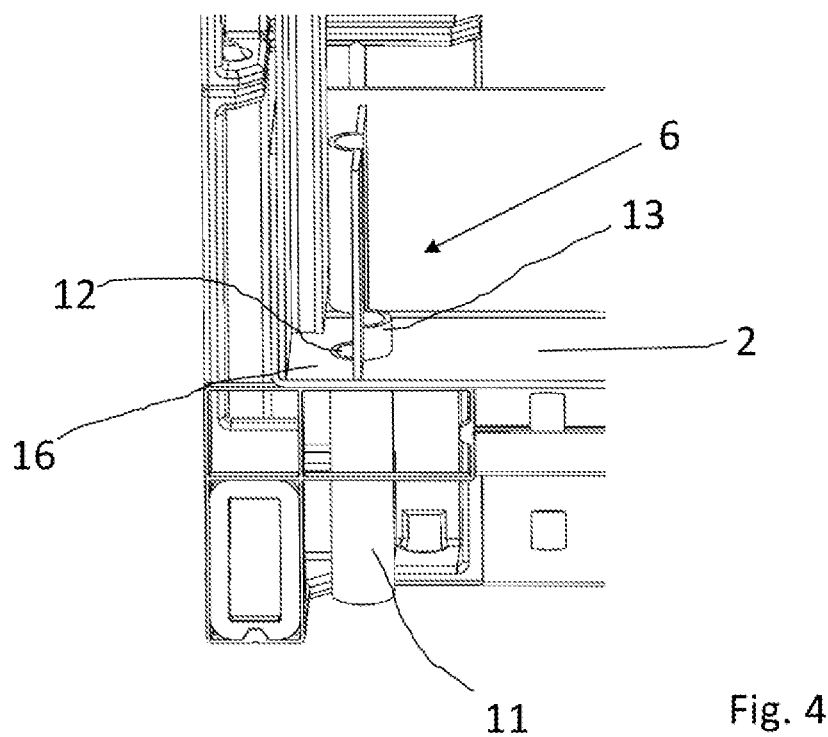
FIG. 4 illustrates a detailed view of the second overflow.

FIG. 4 shows the arrangement of the first inlet 12 and the second inlet 13 of the overflow collector 6. The second inlet 13 serves as an overflow for the tub area 2. By contrast, the first inlet 12 serves as an overflow for liquid that was introduced into the interior of the overflow collector 6. The first and the second inlets 12, 13 both empty into the second overflow 11. In addition, the first inlet 12 is at a same height as a floor 16.

In the block storage element system, at least two block storage elements 1 can be stacked one above the other (not shown), such that a first block storage element 1 is here arranged above a second block storage element 1. The stack geometries 3 of the respective block storage elements 1 are detachably engaged with each other. In this arrangement, the first liquid guide 10 of the second block storage element 1 is arranged below the first overflow 9 of the first block storage element 1. In addition, the second liquid guide 15 of the second block storage element 1 is arranged below the second overflow 11 of the first block storage element 1.

Fresh liquid is introduced into the first liquid guide of the first (upper) block storage element 1. The liquid guide there transfers the liquid into the overflow distributor 5, from where at least one portion of the liquid gets through the passageways 8 and into the tub area 2. The liquid is throttled through the passageways 8, so that the liquid level rises within the overflow distributor 5. As soon as the liquid level has reached the upper end of the first overflow 9, liquid is discharged by way of the first overflow 9. The first overflow 9 of the first block storage element 1 empties into the first liquid guide 10 of the second block storage element. The process there starts over again in the second (lower) block storage element 1.

Liquid that has gotten into the tub area 2 proceeding from the overflow distributor 5 is distributed along the complete tub area 2 by distributor elements 4. As a result, the complete tub area 2 is supplied with fresh liquid. As soon as the tub area 2 is supplied with liquid, liquid also gets to the overflow collector 6. The now consumed liquid there gets into the second liquid guide 15 of the second (lower) block storage element 1 via the second inlet 13 of the first (upper) block storage element 1. The second liquid guide 15 transfers the consumed liquid into the interior of the overflow collector 6, from where the liquid is transferred into the second overflow 11 of the second block storage element 1 by way of the first inlet 12. Here as well, as many block storage elements 1 as desired can be stacked one above the other, so that consumed liquid can be drained.

The overflow distributor 5 in combination with the first liquid guide 10 conduct exclusively fresh liquid. The overflow collector 6 in combination with the second liquid guide 15 take care of consumed liquid. As a result, fresh liquid is separated from the consumed liquid. This enables a good supply of all block storage elements 1 located in the block storage system.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

REFERENCE LIST

1 Block storage element
2 Tub area
3 Stack geometry
4 Distributor element
5 Overflow distributor
6 Overflow collector
7 Distributor limit
8 Passageway
9 First overflow
10 First liquid guide
11 Second overflow
12 First inlet
13 Second inlet
14 Limit
15 Second liquid guide
16 Floor

What is claimed:

1. A method for supplying liquid to block storage elements including a first block storage element and second block storage element arranged one above the other, the method comprising:

introducing the liquid through a first liquid guide of the first block storage element into an overflow distributor in the first block storage element with a distributor limit and an overflow, wherein a discharge end of the first liquid guide is arranged below an upper end of the overflow, wherein the liquid is throttled by at least one passageway arranged in the distributor limit and gets into a tub area of the first block storage element, wherein the liquid that is not drained by way of the at least one passageway is discharged from the first block storage element via the overflow and conducted in a liquid guide of the second block storage element arranged below the first block storage element.

2. The method according to claim 1, wherein the overflow is a first overflow and the liquid introduced into the block storage element from the overflow distributor is drained by way of a second inlet of a second overflow of an overflow collector.

3. The method according to claim 2, wherein the overflows of the first and second block storage elements are first overflows and the liquid introduced into the first and second block storage elements from respective overflow distributors is drained by way of a second inlet of a second overflow of an overflow collector in each of the first and second block storage elements.

4. The method according to claim 3, wherein the liquid drained via the second overflow of the first block storage element is conducted into a second liquid guide of the second block storage element.

5. The method according to claim 4, wherein the liquid conducted into the second liquid guide of the second block storage element via the second overflow of the first block storage element is transferred by way of a first inlet of the second overflow of the second block storage element into a third block storage element arranged below the second block storage element in the direction of gravity.

\* \* \* \* \*